(12) United States Patent  
Chester

(10) Patent No.: US 8,271,771 B1  
(45) Date of Patent: Sep. 18, 2012

(54) SYSTEMS AND METHODS FOR RESTORING AN IMAGE TO A SOFTWARE ENCRYPTED DISK OR VOLUME

(75) Inventor: Robert Chester, Auckland (NZ)

(73) Assignee: Symantec Corporation, Mountain View, CA (US)

( * ) Notice: Subject to any disclaimer, the term of this patent is extended or adjusted under 35 U.S.C. 154(b) by 561 days.

(21) Appl. No.: 12/486,649

(22) Filed: Jun. 17, 2009

(51) Int. Cl.
- *G06F 15/177* (2006.01)
- *G06F 9/00* (2006.01)
- *G06F 9/445* (2006.01)
- *G06F 13/14* (2006.01)

(52) U.S. Cl. ............... 713/1; 713/2; 713/100; 711/100; 714/1; 714/2; 714/6.3; 710/10

(58) Field of Classification Search .............. 711/100; 714/1, 2, 6.3; 713/1, 2, 100; 710/10  
See application file for complete search history.

(56) References Cited

U.S. PATENT DOCUMENTS

| | | | |
|---|---|---|---|
| 6,253,300 B1 * | 6/2001 | Lawrence et al. | 711/173 |
| 6,615,365 B1 * | 9/2003 | Jenevein et al. | 714/6.11 |
| 2006/0190722 A1 * | 8/2006 | Sharma et al. | 713/165 |
| 2008/0165957 A1 * | 7/2008 | Kandasamy et al. | 380/44 |
| 2009/0276662 A1 * | 11/2009 | Shen et al. | 714/19 |

* cited by examiner

*Primary Examiner* — Fahmida Rahman  
(74) *Attorney, Agent, or Firm* — Holland & Hart LLP

(57) ABSTRACT

A computer-implemented method for restoring an image to an encrypted disk is described. An image to restore to the disk is identified. Information is read from one or more filesystems currently residing on the disk to identify one or more sectors on the disk that are reserved for a disk encryption driver. The image is restored to one or more non-reserved sectors on the disk. One or more filesystems are created on the disk that are associated with the restored image.

13 Claims, 7 Drawing Sheets

SYSTEMS AND METHODS FOR RESTORING AN IMAGE TO A SOFTWARE ENCRYPTED DISK OR VOLUME

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Storage devices for data have also increasingly become an integral part of the business world and the activities of individual consumers. A data storage device may store information, process information, or both. A storage device may store a copy of data as a backup so that the original data may be restored from the copy in case a data loss event occurs. The storage device may be part of a computer system or an external device that connects to the computer system.

Data stored on a storage device may be encrypted. Encrypting such data on a storage device may help protect the data should physical security measures fail (e.g., theft of a computer system, etc.). Computer systems may use some form of encryption software to encrypt and decrypt data. The data that is encrypted/decrypted may be in the form of files (or sectors of) hard drives and removable media, email messages, or in the form of packets sent over computer networks. Software encryption has increasingly become a fundamental part of modern computer communications and file protection.

Software encryption may use parts (or sectors) of a storage device (e.g., hard drive) to store information relating to the encryption software itself. For example, certain sectors of a hard drive may store keys or other data pertaining to the functionality of the encryption software. Because these sectors are reserved by the encryption software, data that is encrypted is not able to be stored on these sectors. Errors and other complications arise if a data write is attempted on a reserved sector of a hard drive. As such, benefits may be realized by providing improved systems and methods for storing (or restoring) data to an software encrypted hard drive or other storage device.

SUMMARY

A computer-implemented method for restoring an image to an encrypted disk is described. An image to restore to the disk is identified. Information is read from one or more filesystems currently residing on the disk to identify one or more sectors on the disk that are reserved for a disk encryption driver. The image is restored to one or more non-reserved sectors on the disk. One or more filesystems are created on the disk that are associated with the restored image.

In one embodiment, the one or more filesystems created during the restoration of the image may be analyzed to determine the contents of the one or more filesystems. The one or more reserved sectors may be marked within an internal mechanism of the one or more filesystems created during the restoration of the image based on the content of the one or more filesystems. In one configuration, the content of the one or more filesystems may comprise an operating system.

The one or more filesystems currently residing on the disk and the one or more filesystems created during the restoration of the image may comprise a File Allocation Table (FAT) filesystem or an Extended File Allocation Table (exFAT) filesystem. In another embodiment, the one or more filesystems currently residing on the disk and the one or more filesystems created during the restoration of the image may comprise a New Technology File System (NTFS) or a Universal Disk Format (UDF) filesystem.

In one example, the one or more filesystems currently residing on the disk may mark the one or more reserved sectors in a cluster bitmap maintained by the one or more filesystems currently residing on the disk In one configuration, the identification of the one or more reserved sectors may be transmitted to a server. Restoring the image to the disk may comprise writing the image directly to the non-reserved sectors of the disk in order to avoid volume level encryption of the image.

A computer system configured to restore an image to an encrypted disk is also described. The computer system may include a processor and memory in electronic communication with the processor. The computer system may also include an image restore engine configured to identify an image to restore to the disk, and read information from one or more filesystems currently residing on the disk to identify one or more sectors on the disk that are reserved for a disk encryption driver. The engine may be further configured to restore the image to one or more non-reserved sectors on the disk, and create one or more filesystems on the disk that are associated with the restored image.

A computer-program product for restoring an image to an encrypted disk is also described. The computer-program product may include a computer-readable medium having instructions thereon. The instructions may include code programmed to identify an image to restore to the disk. The instructions may further include for programmed to read information from one or more filesystems currently residing on the disk to identify one or more sectors on the disk that are reserved for a disk encryption driver. The instructions may also include code programmed to restore the image to one or more non-reserved sectors on the disk, and code programmed to create one or more filesystems on the disk that are associated with the restored image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
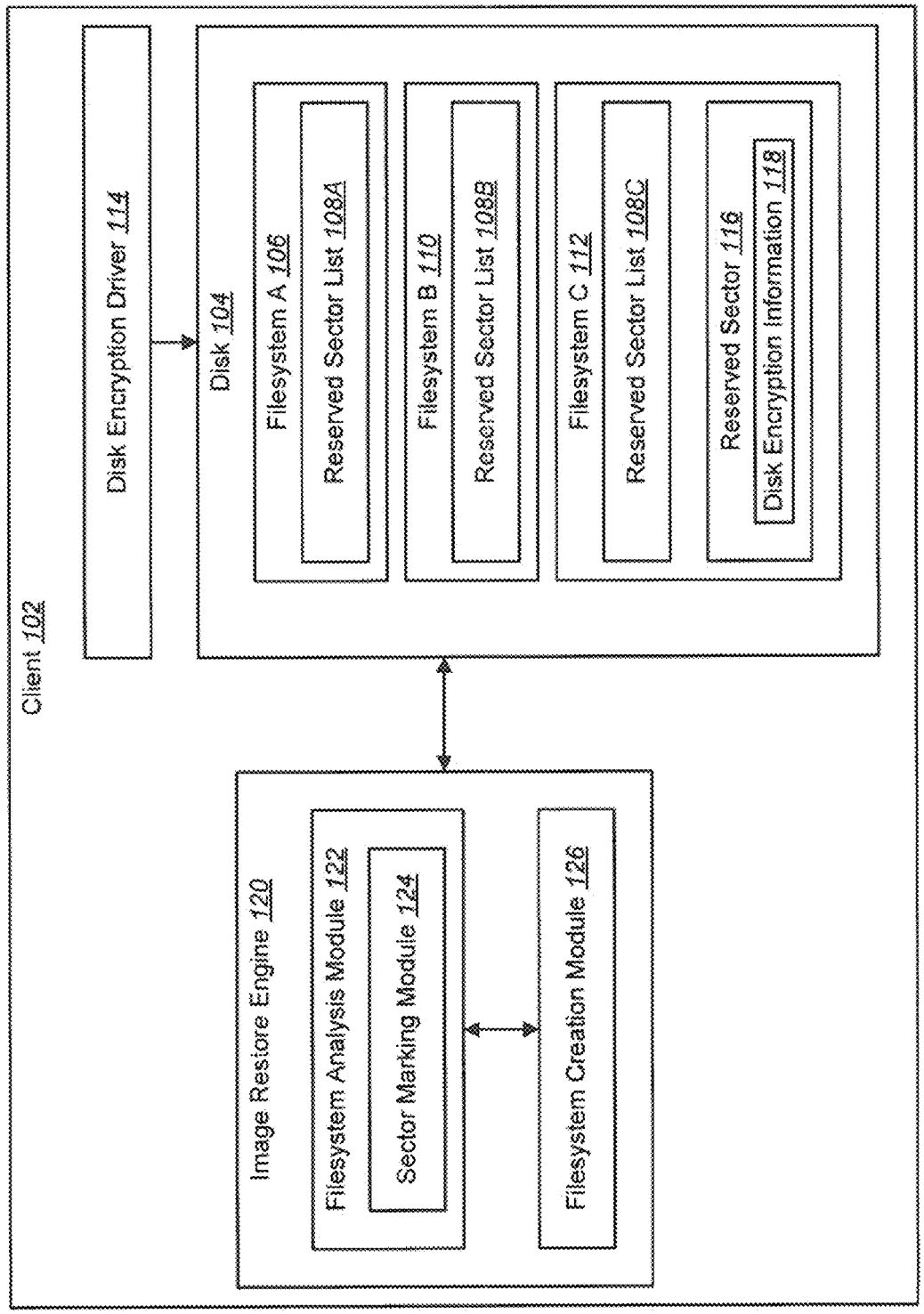
FIG. 1 is a block diagram illustrating one embodiment of a client computing device that may implement the present systems and methods.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing technology, a back-up may refer to a copy of a system stored as an image (or data, file, archive, etc.). The back-up of the system may be used to restore the original system after a data loss event has occurred. In one example, an image may be restored to a disk (or volume), such as a hard disk drive. The disk may include software that digitally encrypts data on the disk. In one embodiment, this software may be used to encrypt the image as it is restored to the disk.

Software that encrypts data on a disk (or volume) may reserve one or more sectors on the disk. These reserved sectors may be used to store information, keys, and other data relating to the encryption of the disk. In addition, the encryption software may be associated with a driver or bios hook to encrypt/decrypt reads and writes to the disk to non-reserved sectors. If a restoration engine attempts to write an image to a reserved sector, the drive or bios hook may cause the write to fail.

Currently, a image restoration engine (such as "Ghost") may create a filesystem for a restored image on the disk directly using on-disk structures by laying out all of the required sectors. This approach may prevent the engine from being able to select an alternate sector when it encounters a bad sector during a write to the disk. Instead, before restoring an image, the image restoration engine may scan the entire disk in order to identify the sectors on the disk that have been reserved by a software encryption package. During the scan, a reserved sector may appear to be a "bad sector" from the perspective of the restoration engine. A complete scan of the disk (or volume) is an expensive and time-consuming operation. The present systems and methods allow the restoration engine to identify the reserved sectors of a software encrypted disk without having to complete a full scan of the disk before writing an image to the disk.

FIG. 1 is a block diagram illustrating one embodiment of a client computing device 102. In one example, the client 102 may be, without limitation, a workstation, a laptop, a personal digital assistant ("PDA"), a handheld device, or any other type of computing system or device.

In one configuration, the client 102 may include a disk 104 (or volume). The disk 104 may be used to store images or files. As illustrated, the disk 104 may include one or more filesystems 106, 110, 112. In computing, a filesystem provides a way to store and organize computer files associated with an image so that the image may be easily accessed. Filesystems 106, 110, 112 may use a data storage device, such as the disk 104, and may maintain the physical location of files stored on the disk 104.

In one configuration, the client 102 may include a disk encryption driver 114. The driver 114 may encrypt images or data that are written to the disk 104. In one embodiment, the disk 104 may include multiple sectors in which data may be stored. The disk encryption driver 114 may reserve a certain number of these sectors to store its own information. For example, the disk 104 may include a reserved sector 116 that stored disk encryption information 118. The disk encryption information 118 may include keys and other information pertaining to the driver 114.

In one configuration, each filesystem 106, 110, 112 currently on the disk 104 may include a mechanism to record the reserved sectors (or bad clusters) so that the filesystems 106, 110, 112 do not attempt to make use of these sectors/clusters when writing data to the disk 104. In one example, the reserved sector 116 may appear to be a bad sector from the perspective of the filesystems 106, 110, 112. The filesystems 106, 110, 112 may maintain a reserved sector list 108A, 108B and 108C that identifies the reserved sectors on the disk 104. In one example, the reserved sectors 116 may be part of a filesystem. For example, the reserved sectors 116 that include the disk encryption information 118 may be part of filesystem C 112. In one embodiment, the filesystems 106, 110, 112 may be mounted on top of a volume which may appear to the filesystems as a contiguous range of sectors (e.g., 0 to n). Any given set of disk encryption information 118 and reserved sectors 116 may reside within one of the filesystems 106, 110, 112. If more than one region of reserved sectors 116 exist, each region may exist in a different filesystem.

For clients 102 that implement a Windows® based operating system, systems, a File Allocation Table (FAT) filesystem or a New Technology File System (NTFS) may be used. Both of these filesystems may include a mechanism to identify, mark, and record reserved sectors (bad sectors) into a reserved sector list 108 using various implementations. For example, the FAT filesystem may mark bad sectors in a FAT table. In one embodiment, a NTFS may have a specific file (e.g., $BAD) that reserved sectors are allocated to. These reserved sectors may also be marked off in the filesystem 104, 110, 112 cluster bitmap in order to prevent the reserved sectors from being allocated to a file being written to the disk 104.

The client 102 may also include an image restore engine 120 that may write data to the disk 104 in order to restore the data. In one embodiment, the source of the restoration operation performed by the image restore engine 120 may be an image that is local to the client 102. The source of the restore operation may also be across a network connection. In another embodiment, the source of the restore operation may be another disk or volume that is attached to the client 102, either directly or across a network. In another embodiment, the source may be a file archive (e.g., tar, zip, etc.) that is restored.

The engine 120 may include a filesystem analysis module 122 or 222 that may analyze each filesystem 106, 110, 112 that is currently on the disk 104. Before an image is restored to the disk 104 by the engine 120, the analysis module 122 may analyze the reserved sector list 108 maintained by each filesystem 106, 110, 112 in order to identify or determine which sectors are reserved by the disk encryption driver 114. The image restore engine 120 may then write or restore an image to the disk 104 using sectors that have not been reserved (non-reserved sectors) by the disk encryption driver 114.

In one embodiment, a filesystem creation module 126 or 224 may create one or more filesystems to be loaded on the disk 104 that are associated with the restored image. In one configuration, the analysis module 122 may also include a sector marking module 124. In one example, the filesystem analysis module 122 may analyze the one or more newly created filesystems that are created by the creation module 126. Depending on the content of the newly created filesystems, the sector marking module 124 may mark each reserved sector on the disk 104 as a bad cluster in the newly created filesystems. For example, the analysis module 122 may determine whether one or more of the newly created filesystems are associated with an operating system. In other words, if the restored image to the disk 104 is an operating system, the sector marking module 124 may mark each sector on the cluster bitmap of the filesystem that is reserved by the disk encryption driver 114. When the operating system associated with the newly created filesystems attempts to boot up, the boot up procedure will be aware of the sectors that are reserved for the disk encryption driver 114. The boot up procedure may then avoid any writes to the reserved sectors during the boot up process of the operating system.

Figure 2:
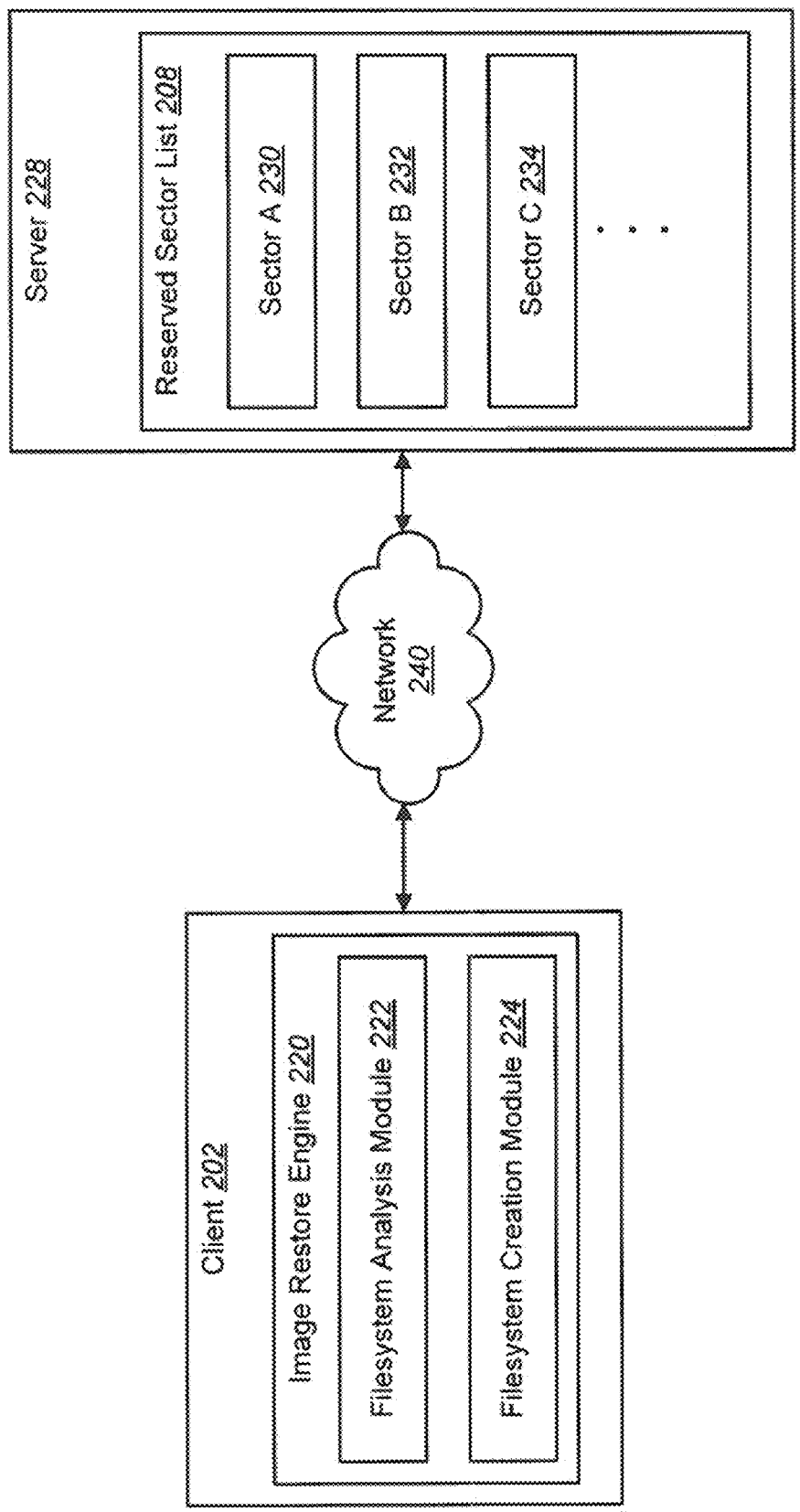
FIG. 2 is a block diagram illustrating one embodiment of a client communicating with a server across a network connection to implement the present systems and methods.

FIG. 2 is a block diagram illustrating one embodiment of a client 202 communicating with a server 228 across a network connection 240. In one example, the server 228 may maintain a reserved sector list 208. The reserved sector list 208 may include the identity of each sector 230, 232, 234 that is reserved or unavailable on a disk 104 that may be part of the client 202. In another embodiment, the reserved sector list 208 may be maintained locally on the client 202. For example, the list 208 may be maintained in one of the filesystems 106, 110, 112 residing on the disk 104.

In one example, as the image restoration engine 220 becomes aware of the reserved sectors on the disk 104, the client 202 may transmit the identity of these reserved sectors to the server 228. The engine 220 may become aware of which sectors are reserved by analyzing filesystems 106, 110, 112 currently residing on the disk 104. These filesystems 106, 110, 112 may maintain a list or record of each sector on the disk 104 that is reserved by the disk encryption driver 114.

In one configuration, as the server 228 receives the identity of the reserved sectors, the server 228 may maintain or update the sector list 208 with the identity of these sectors. When the image restoration engine 220 begins to restore an image to the disk 104, the server 228 may communicate to the client 202 the sectors 230, 232, 234 which have been reserved and are unavailable to accept writes of data for the restored image.

Figure 3:
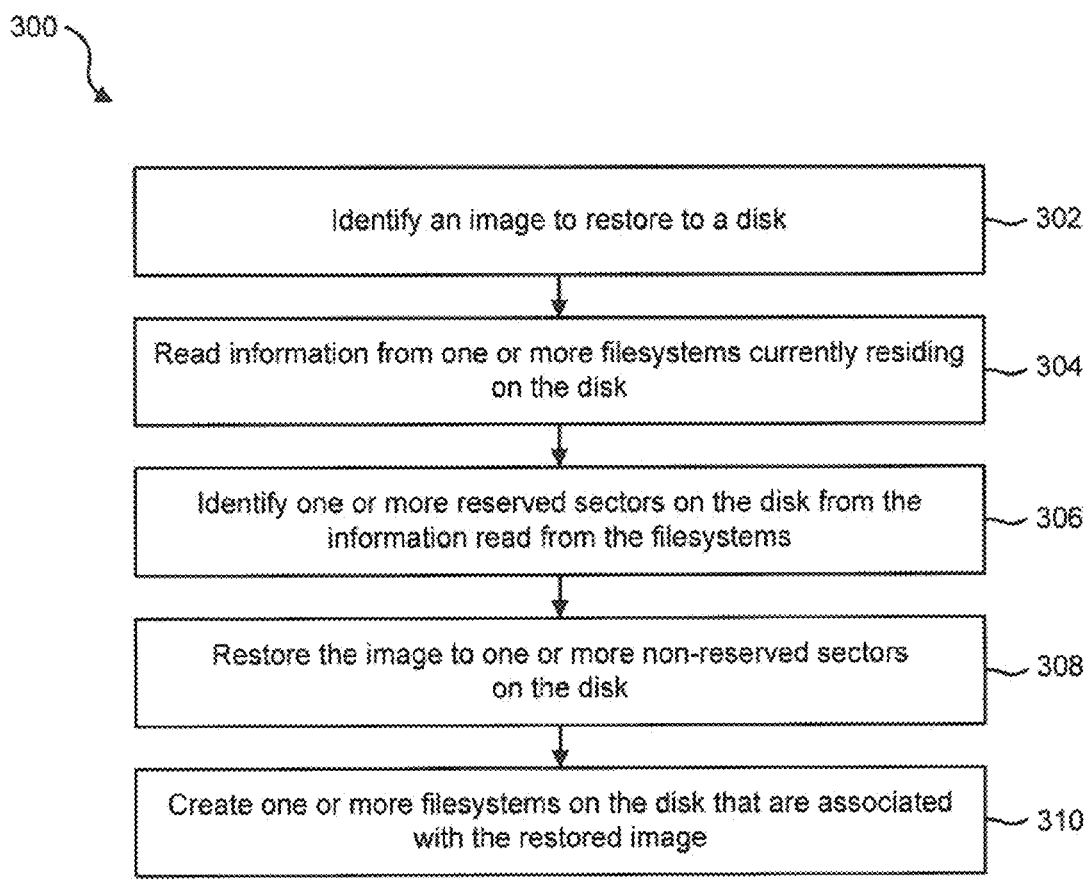
FIG. 3 is a flow diagram illustrating one embodiment of a method for restoring an image to a software encrypted disk or volume.

FIG. 3 is a flow diagram illustrating one embodiment of a method for restoring an image to a software encrypted disk or volume. In one configuration, the method 300 may be implemented by the image restore engine 120.

In one embodiment, an image to restore to a disk 104 may be identified 302. A disk encryption driver 114 may encrypt the data on the disk 104. In one example, information from one or more filesystems that currently reside on the disk may be read 304. The information may include a list of sectors reserved for the disk encryption driver 114. One or more reserved sectors on the disk may be identified 306 from the information that is read from the filesystems. In one embodiment, the image may be restored 308 to one or more non-reserved sectors on the disk. One or more filesystems may then be created 310 on the disk 104. The newly created filesystems may be associated with the restored image. In one embodiment, the method 300 may allow the image restore engine 120 to restore an image to a disk 104 without having to first complete a full scan of the disk 104 in order to determine which sectors are unavailable or reserved by the software encryption driver 114.

In one embodiment, the restored image may be encrypted on the disk. In another embodiment, the restored image may be written directly to the disk. In other words, the image is written directly to the sectors of the disk as unencrypted data. Whether the restored image is encrypted at the volume level or unencrypted by writing the image directly to the disk, the method 300 may be implemented to identify the reserved sectors of the disk. These reserved sectors may still be avoided if the image is written directly to the disk as unencrypted data. The reserved sectors may also be marked within the one or more newly created filesystems, as explained below.

Figure 4:
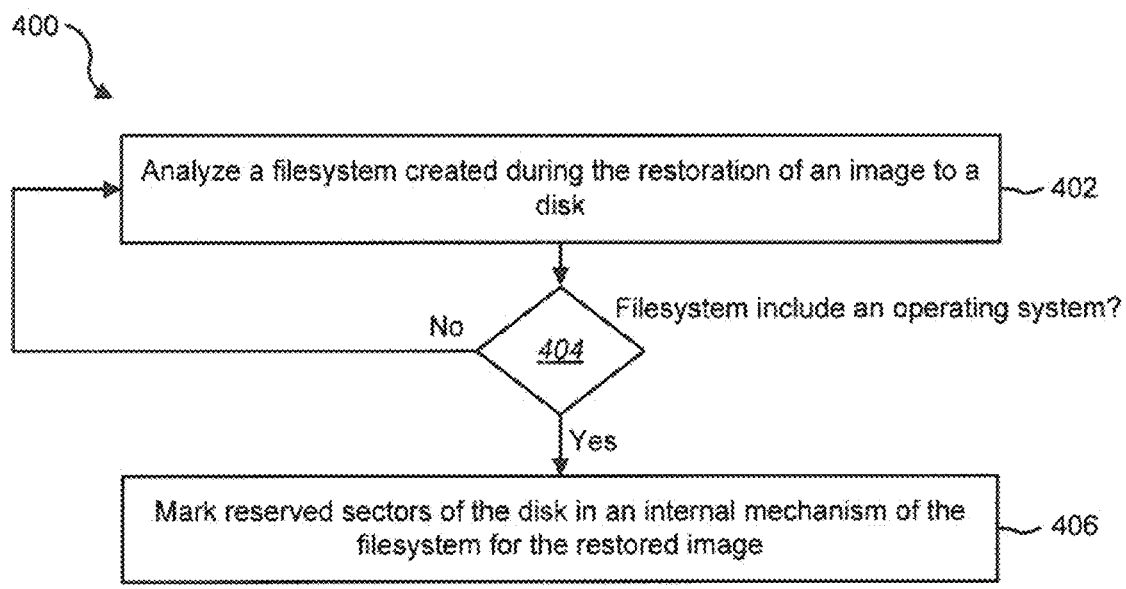
FIG. 4 is a flow diagram illustrating one embodiment of a method for determining whether to mark reserved sectors within a filesystem that is associated with an image recently restored to the disk.

FIG. 4 is a flow diagram illustrating one embodiment of a method 400 for determining whether to mark reserved sectors within one or more filesystems that are associated with an image recently restored to the disk 104. In one configuration, the method 400 may be implemented by the image restore engine 120 on the client 102.

In one example, one or more filesystems that are created during the restoration of an image to a disk may be analyzed 402. A determination 404 may be made as to whether the filesystems include an operating system. If it is determined 404 that the filesystems do not include an operating system, the method 400 may return to continue analyzing 402 filesystems that are created during the restoration of an image to the disk 104. If, however, it is determined 404 that the filesystems do include an operating system, reserved sectors of the disk 104 may be marked 406 in an internal mechanism of the filesystems that were created for the restored image.

In another embodiment, the reserved sectors of the disk 104 may be marked 406 in the newly created filesystems regardless of whether an operating system is installed. Pre-marking the reserved sectors as bad clusters in the filesystems may eliminate the need for the filesystems to discover the reserved sectors for themselves.

Figure 5:
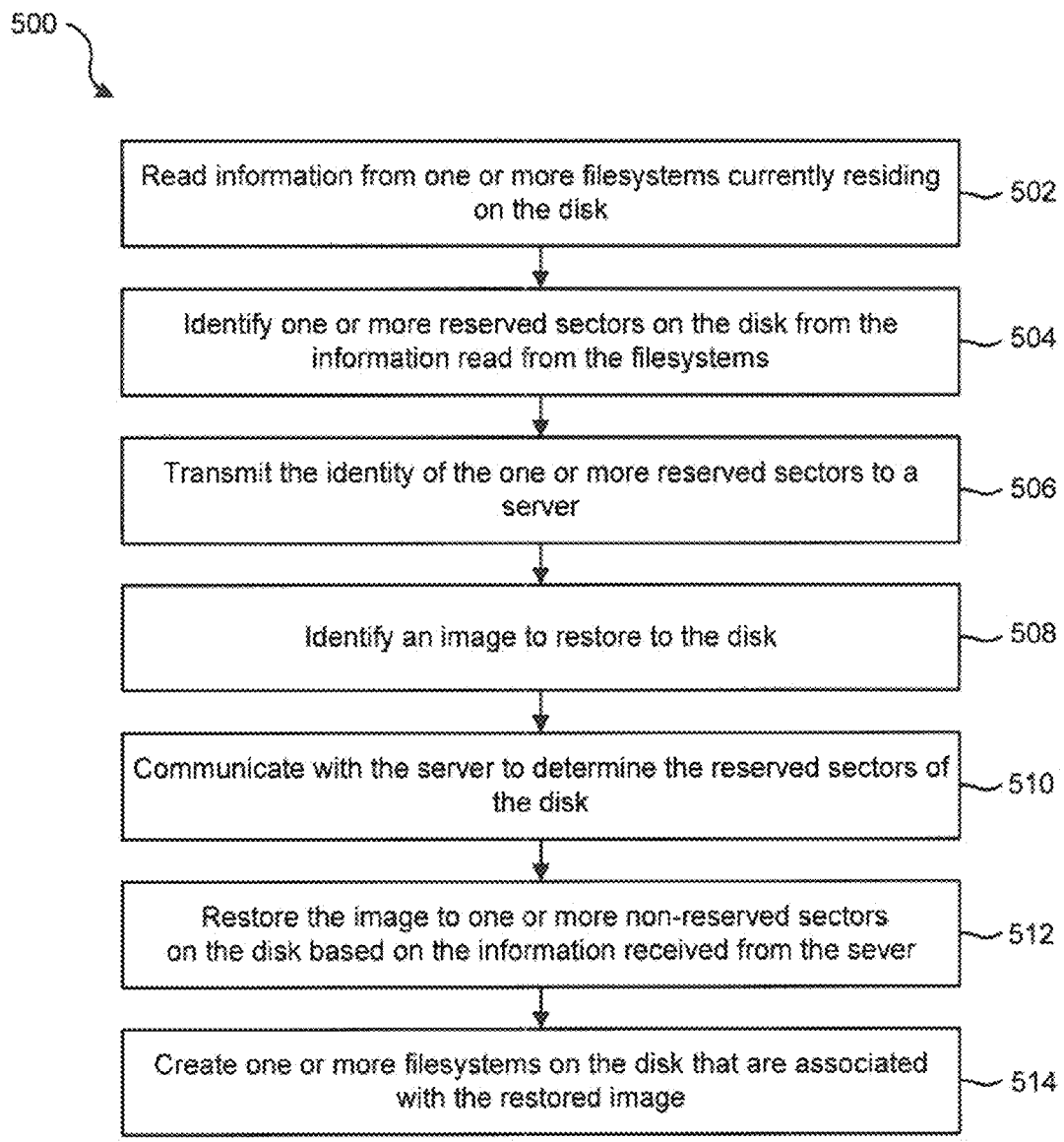
FIG. 5 is a flow diagram illustrating one embodiment of method for identifying reserved sectors on a disk via communication with a server.

FIG. 5 is a flow diagram illustrating one embodiment of a method 500 for identifying reserved sectors on a disk 104 via communication with a server 228. In one embodiment, the method 500 may be implemented by the image restore engine 120 on the client 102.

In one example, information from one or more filesystems currently residing on a disk 104 may be read 502. In one example, one or more reserved sectors on the disk may be identified 504 from the information read from the filesystems. The identity of the one or more reserved sectors may be transmitted 506 to a server 228. In one embodiment, the image restore engine 120 may identify 508 an image to restore to the disk 104. In one configuration, the client 102 may reboot from running a main operating system to run from a pre-operating system. For example, the client 102 may reboot and instead of running from the main operating system, the client 102 may now run from a pre-operating system, such as Windows Pre-installation Environment ("PE").

The engine 120 may communicate 510 with the server in order to determine the reserved sectors of the disk 104. When the reserved sectors are determined from the server 228, the image may be restored 512 using one or more non-reserved sectors on the disk 104 and avoiding the reserved sectors. The non-reserved sectors may be determined based on the information received from the server 228. In one embodiment, one or more filesystems may be created 514 on the disk. The newly created filesystems may be associated with the restored image. In one configuration, the reserved sectors may be marked as bad clusters in the newly created filesystems.

Figure 6:
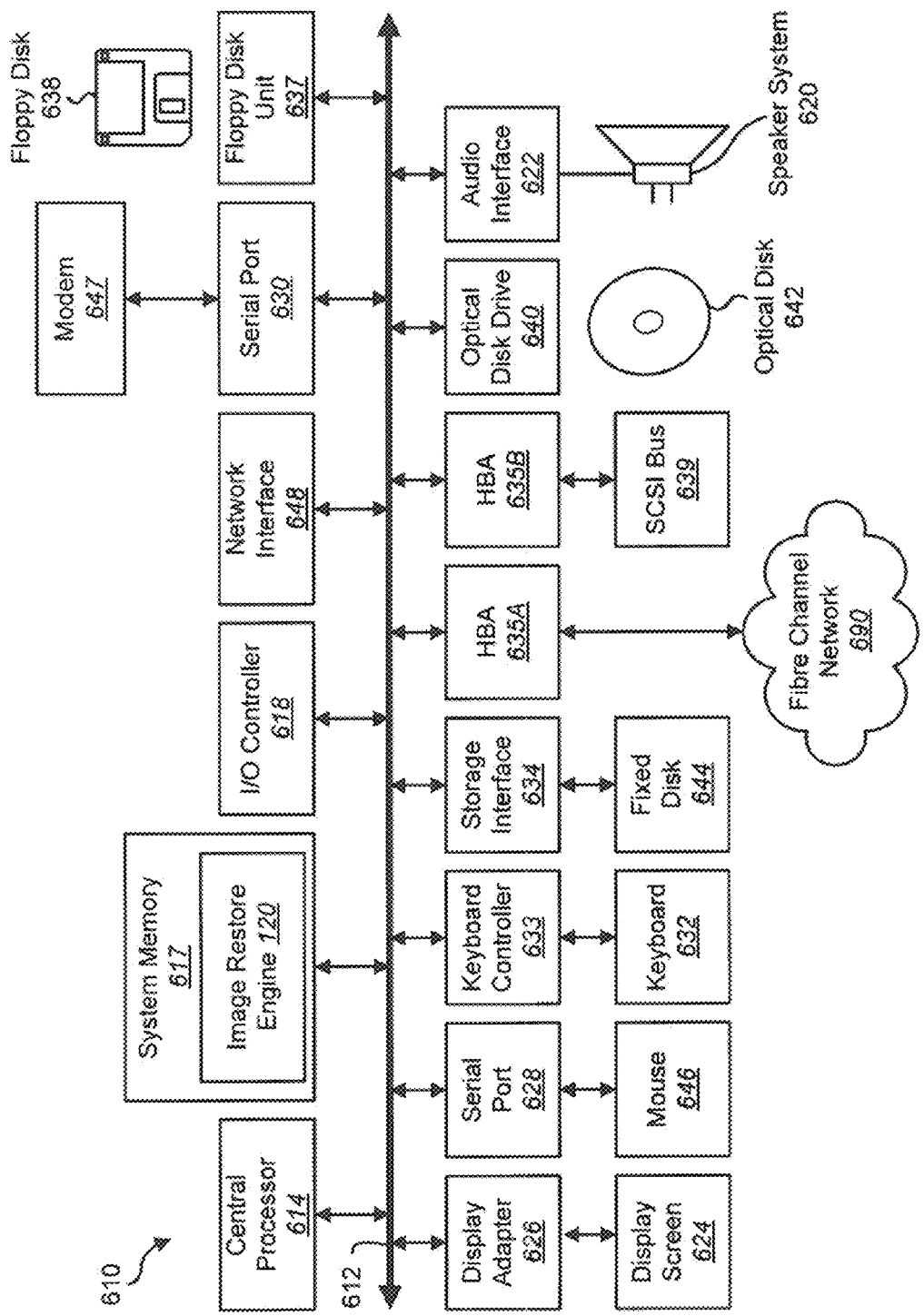
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the image restore engine 120 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Examples of the computer system 610 may include smart phones, personal digital assistants (PDAs), and other mobile internet devices (MIDs) and netbooks, any of which may host an email client. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
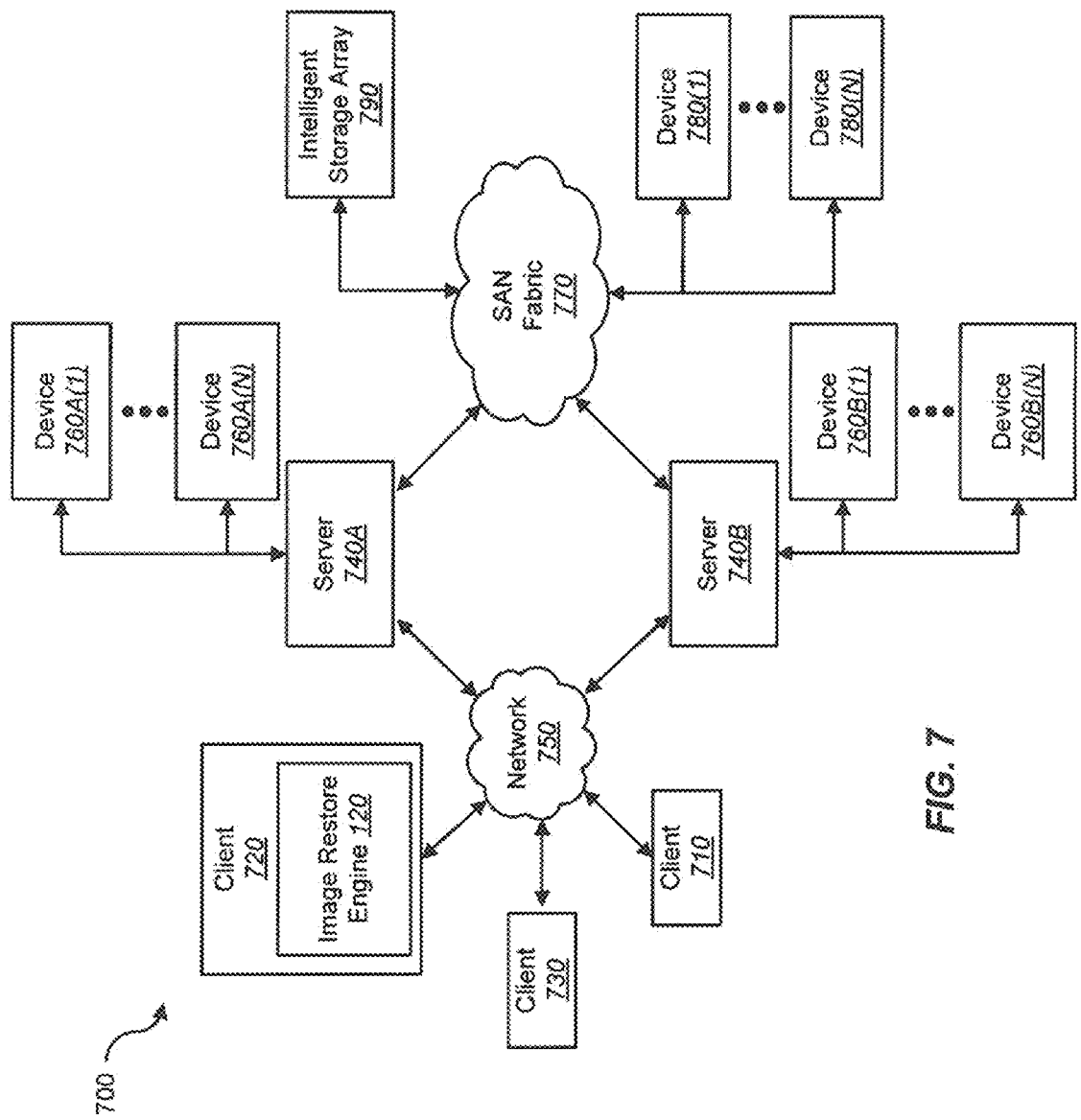
FIG. 7 is a block diagram depicting a network architecture in which client systems and storage servers are coupled to a network.

FIG. 7 is a block diagram depicting a network architecture 700 in which client systems 710, 720 and 730, as well as storage servers 740A and 740B (any of which can be implemented using computer system 610), are coupled to a network 750. In one embodiment, the image restore engine 120 to implement the present systems and methods may be located within a client system 710, 720, 730. The storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the disclosure. SAN fabric 770 supports access to storage devices 780(1)-(N) by storage servers 740A and 740B, and so by client systems 710, 720 and 730 via network 1250. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 840B or one of storage devices 760A(1)-(N), 760B(1)-(N), 780(1)-(N) or intelligent storage array 790. FIG. 7 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring an image to an encrypted disk, comprising:
    identifying an image to restore to the disk;
    reading information from one or more filesystems currently residing on the disk to identify one or more sectors on the disk that are reserved for a disk encryption driver;
    restoring the image by writing the image to one or more non-reserved sectors on the disk to prevent a volume level encryption of the image;
    creating one or more filesystems on the disk that are associated with the restored image;
    determining the content of the one or more created filesystems; and
    upon determining that the content is a first predetermined type, marking the one or more reserved sectors of the disk within the one or more created filesystems to prevent an operating system, of the one or more created filsystems, from writing to the one or more reserved sectors on the disk that are reserved for the disk encryption driver during a boot up process of the operating system; and
    upon determining that the content is of a second predetermined type, bypassing the marking of the one or more reserved sectors of the disk within the one or more created filesystems.

2. The method of claim 1, wherein the first predetermined type comprises an operating system.

3. The method of claim 1, wherein the one or more filesystems currently residing on the disk and the one or more filesystems created during the restoration of the image comprise a File Allocation Table (FAT) filesystem or an Extended File Allocation Table (exFAT) filesystem.

4. The method of claim 1, wherein the one or more filesystems currently residing on the disk and the one or more filesystems created during the restoration of the image comprise a New Technology File System (NTFS) or a Universal Disk Format (UDF) filesystem.

5. The method of claim 1, wherein the one or more filesystems currently residing on the disk mark the one or more reserved sectors in a cluster bitmap maintained by the one or more filesystems currently residing on the disk.

6. The method of claim 1, further comprising transmitting the identification of the one or more reserved sectors to a server.

7. A computer system configured to restore an image to an encrypted disk, comprising:
    a processor;
    memory in electronic communication with the processor;
    an image restore engine configured to:
        identify an image to restore to the disk;
        read information from one or more filesystems currently residing on the disk to identify one or more sectors on the disk that are reserved for a disk encryption driver;
        restore the image by writing the image to one or more non-reserved sectors on the disk to prevent a volume level encryption of the image;
        create one or more filesystems on the disk that are associated with the restored image;
        determine the content of the one or more created filesystems; and
        upon determining that the content is a first predetermined type, mark the one or more reserved sectors of the disk within the one or more created filesystems to prevent an operating system, of the one or more created filsystems, from writing to the one or more reserved sectors on the disk that are reserved for the disk encryption driver during a boot up process of the operating system; and
        upon determining that the content is of a second predetermined type, bypass the marking of the one or more reserved sectors of the disk within the one or more created filesystems.

8. The computer system of claim 7, wherein the first predetermined type comprises an operating system.

9. The computer system of claim 7, wherein the one or more filesystems currently residing on the disk and the one or more filesystems created during the restoration of the image comprise a File Allocation Table (FAT) filesystem or an Extended File Allocation Table (exFAT) filesystem.

10. The computer system of claim 7, wherein the one or more filesystems currently residing on the disk and the one or more filesystems created during the restoration of the image comprise a New Technology File System (NTFS) or a Universal Disk Format (UDF) filesystem.

11. The computer system of claim 7, wherein the one or more filesystems currently residing on the disk mark the one or more reserved sectors in a cluster bitmap maintained by the one or more filesystems currently residing on the disk.

12. The computer system of claim 7, wherein the image restore engine is further configured to transmit the identification of the one or more reserved sectors to a server.

13. A computer-program product for restoring an image to an encrypted disk, the computer-program product comprising a non-transitory computer-readable medium having executable instructions stored thereon to be executed by a processor, the instructions comprising:

code programmed to identify an image to restore to the disk;

code programmed to read information from one or more filesystems currently residing on the disk to identify one or more sectors on the disk that are reserved for a disk encryption driver;

code programmed to restore the image by writing the image to one or more non-reserved sectors on the disk to prevent a volume level encryption of the image;

code programmed to create one or more filesystems on the disk that are associated with the restored image;

code programmed to determine the content of the one or more created filesystems; and upon determining that the content is a first predetermined type, code programmed to mark the one or more reserved sectors of the disk within the one or more created filesystems to prevent an operating system, of the one or more created filsystems, from writing to the one or more reserved sectors on the disk that are reserved for the disk encryption driver during a boot up process of the operating system; and upon determining that the content is of a second predetermined type, code programmed to bypass the marking of the one or more reserved sectors of the disk within the one or more created filesystems.

* * * * *